United States Patent [19]

Aremka et al.

[11] 4,244,083
[45] Jan. 13, 1981

[54] CABLE CLAMP

[75] Inventors: Leonard R. Aremka, Chicago; Harold D. Cook, Wheaton, both of Ill.

[73] Assignee: Teletype Corporation, Skokie, Ill.

[21] Appl. No.: 35,658

[22] Filed: May 3, 1979

[51] Int. Cl.³ .................. B65D 63/00; A44B 21/00
[52] U.S. Cl. .................... 24/16 R; 24/263 R;
24/263 B; 248/74 R; 403/398
[58] Field of Search .......... 24/16 R, 263 R, 263 B,
24/263 CA; 248/74 R, 74 A, 316 E; 85/49;
269/217; 403/213, 398, 399

[56] References Cited

U.S. PATENT DOCUMENTS

| 2,017,626 | 10/1935 | Kohnke | 403/398 |
| 2,113,852 | 4/1938 | Meade | 24/263 B |
| 2,918,240 | 12/1959 | Wiegand | 24/16 R |
| 2,931,607 | 4/1960 | McFarland | 248/74 R |
| 3,061,254 | 10/1962 | Piasecki | 248/74 R |
| 3,147,754 | 9/1964 | Koessler | 248/74 R |
| 3,346,688 | 10/1967 | Fields | 24/263 R |
| 3,376,004 | 4/1968 | Goldman | 24/16 R |
| 3,602,961 | 9/1971 | Shibata | 24/263 R |
| 4,175,728 | 11/1979 | Ferguson | 24/16 R |

FOREIGN PATENT DOCUMENTS

| 221618 | 11/1961 | Austria | 24/263 R |
| 621478 | 9/1961 | Belgium . | |
| 576249 | 5/1959 | Canada | 24/263 R |
| 389225 | 6/1965 | Switzerland . | |
| 972731 | 10/1964 | United Kingdom | 24/16 PB |
| 1538434 | 1/1979 | United Kingdom | 24/16 R |

Primary Examiner—Victor N. Sakran
Attorney, Agent, or Firm—J. C. Albrecht; W. K. Serp

[57] ABSTRACT

The disclosure describes a cable clamp which will adapt to and hold firmly cables of various diameters. The clamp includes a "U" shaped body member having a base from which parallel legs project. The outer surface of each of the legs carries a row of teeth. A keeper having a flat plate defining two spaced rectangular openings is placed into engagement with the legs. Relative movement between the plate and the legs is inhibited by the teeth engaging the edges of the openings. Carried on the plate and projecting toward the base of the body member are parallel walls which define angled edges. The edges cam a cable placed between the legs firmly against the base and one leg of the body member.

4 Claims, 3 Drawing Figures

U.S. Patent    Jan. 13, 1981    4,244,083
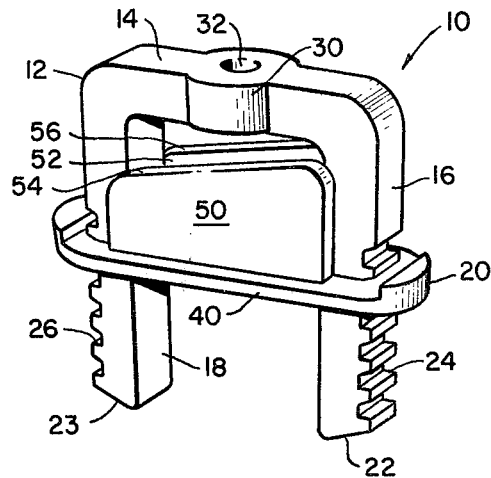
FIG. 1
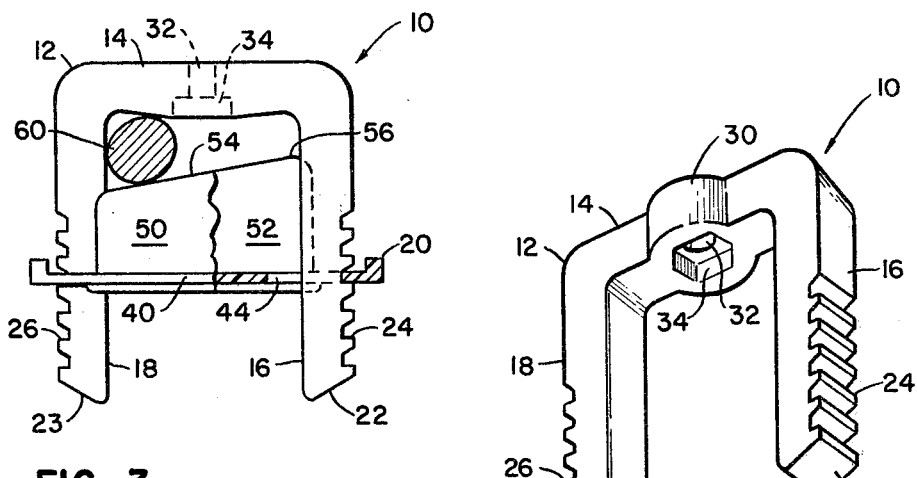
FIG. 3
FIG. 2
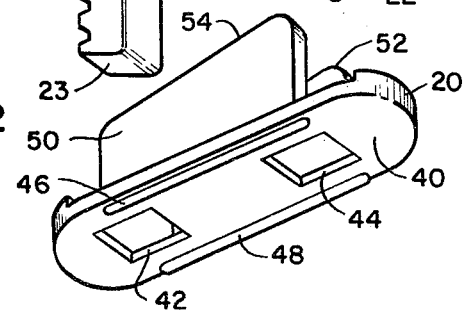

CABLE CLAMP

DESCRIPTION

1. Technical Field

This invention relates to a cable clamp for retaining a relatively wide range of cable diameters.

2. Background Art

Various devices have been suggested for retaining a cable firmly in place. As used herein the term cable refers to a single wire or multiple wires routed in a common direction. Such clamps have generally been designed to retain a cable having a predetermined diameter. In the event the cable diameter varies from the cable diameter for which the clamp was designed, another cable clamp will have to be selected thus requiring a large clamp inventory. The illustrated embodiment includes means for adapting the cable capacity of the clamp to the diameter of the cable being retained and thus allows various cable sizes to be routed therethrough without necessitating the selection of a new clamp for each change in cable diameter. Additionally, the illustrated clamp is convenient to use and does not require the use of any special installation tools.

DISCLOSURE OF THE INVENTION

The clamp includes a "U" shaped member having a base portion and two parallel legs extending from the base portion. A keeper having a relatively flat plate defines at least two spaced openings for receiving the legs of the body member. The edges of the opening are placed into engagement with retaining means defined by the outwardly disposed surfaces of the legs when the keeper is placed upon the body member. The keeper includes means for positioning a cable placed between the legs of the body member against a selected portion of the body member. The positioning means defines a camming edge, the plane of which intersects the axes of the legs at an acuted angle, and serves to engage and position the cable. The camming edge of the positioning means is defined by an edge of a first planar wall extending from the keeper plate.

More particularly, a second planar wall extends from the plate and is spaced from and parallel to the first wall and defines a second camming edge lying along a common plane with the camming edge of the first wall. Both camming edges cooperate to position a cable placed between the legs against the base and one of the legs of the body member.

DRAWINGS

FIG. 1 is a perspective view of the cable clamp including certain features of this invention;

FIG. 2 is an exploded view of the cable clamp illustrated in FIG. 1, and

FIG. 3 is a plan view of the clamp of FIG. 1 in cooperation with a cable and with portions of the clamp removed for clarity of illustration.

DETAILED DESCRIPTION

Structure

With particular reference to FIG. 1, the clamp 10 includes a body member 12 in the shape of a "U" having a base portion 14 and parallel projecting legs 16 and 18. Camming surfaces to facilitate positioning of a keeper 20 into engagement with the legs 16 and 18 are provided at the ends 22 and 23 of each of the legs 16 and 18 which are slanted outwardly and upwardly as viewed in FIGS. 1, 2 and 3 toward the plane of the base 14. The legs 16 and 18 are substantially square in cross section and the outwardly disposed surfaces of each of the legs define retaining means which in the illustrated embodiment is a row of notches or teeth 24 and 26. The edges of each of the teeth 24, 26 are slanted toward the plane of the base 14 to facilitate adjustment of the keeper 20 as will be hereinafter further considered.

The base 14 defines a centrally located, enlarged portion 30 with a centrally positioned hole 32 therethrough. The surface of the enlarged body portion 30 disposed toward the legs 16, 18 defines a hexagonal recess 34 (FIG. 2) the walls of which are shaped to securely receive the hexagonally shaped head of a screw (not shown). When the screw is positioned with the threaded stud thereof passing through the hole, the head of the screw is seated in the recess 34. The screw serves to secure the body member to a frame (not shown) or other support structure. The body member 12 is preferably constructed of a relatively low cost resilient material such as nylon which exhibits sufficient resiliency to allow flexure of the legs inwardly to facilitate positioning with the keeper 20 over the legs 16, 18.

The keeper 20 includes a flat plate 40 which defines a pair of spacially positioned rectangular openings 42 and 44 having their major axes parallel to the longitudinal dimension of the plate 40. The width of the rectangular openings 42 and 44 are slightly greater than the width of the legs 16 and 18 of the body member 12 to facilitate positioning over the legs 16 and 18. The thickness of the plate is such that it will readily fit between adjacent teeth of the rows of teeth 24 and 26 defined by the legs 16 and 18 of the body member 12. Alternately, the outer surfaces of the legs 16 and 18 may be knurled to prevent movement of the plate 40 along the legs when the plate 40 is positioned over the legs 16 and 18. Serving to stiffen the plate are a pair of spaced, elongated, parallel ribs 46 and 48 (FIG. 3) which project from the downwardly disposed surface of the plate 40.

Positioned on the upwardly disposed surface of the plate 40 opposite the surface carrying the ribs 46, 48 are a pair of parallel walls 50, 52. The base of each wall 50, 52 is secured to the plate 40 adjacent one of the longitudinal edges of the plate 40. It will be appreciated, that the width of each wall is slightly greater than the minimum distance between the legs 16 and 18. The walls 50 and 52 are identically shaped and the upwardly disposed end of each of the walls 50 and 52 respectively define camming edges 54, 56. The common plane in which the edges 54, 56 lie forms an acute angle with the surface of the plate 40 and with the axes of the legs 16 and 18 and serves to cam a cable 60 (FIG. 3) into place against the base 14 and leg 18 thus serving to assure accommodation of smaller or larger diameter cables. Each of the walls 50, 52 has a maximum height above the plate 40 at least as great as the distance between the base 12 and the start of the teeth 24, 26 on the legs 16, 18, illustrated in FIG. 2.

Operation

As mentioned, the body member 12 is secured to the available supporting structure (not shown) by means of a screw or other suitable fastener (not shown) and the cable 60 is routed between the legs 16, 18 of the body member 12. Thereafter, the legs 16 and 18 of the body member 12 are manually squeezed together and the rectangular openings 42, 44 defined by the keeper plate 40 aligned with the ends of the legs 16, 18 and the plate 40 is forced towards the base 14 of the body member 12. The slanted surfaces of the teeth 16 and 18 facilitate movement of the plate 40 along the legs 16, 18 and towards the base 14. As the plate 40 moves toward the base 14, the camming edges 54, 56 of the walls 50, 52 engage the cable 60. As the camming edges 54, 56 engage the cable 60, the cable 60 is forced against the base 14 and against the leg 18 of the body member 12 until it is securely seated in the clamp 10. Thereafter, the legs 16 and 18 are released allowing the teeth 24, 26 defined by the outer surface of the legs 16, 18 to engage the respective ends of the openings 42, 44 defined by the keeper plate 40. The resiliency of the legs serves to bias the legs against the keeper plate 40 thus holding keeper 20 firmly in place. In this manner the clamp 10 adjusts to the diameter of the cable 60 being retained. In the event the diameter of the cable 16 is changed, the legs 16, 18 are squeezed inwardly and the keeper 20 retracted. The new cable is then positioned between the legs 16, 18 and the keeper 20 reinstalled. Thus, it will be appreciated that the cable clamp 10 illustrated is variable over a wide range adapting to various cable diameters.

What is claimed is:

1. A clamp 10 for securely retaining a cable 60 including a "U" shaped body member 12 having a base portion 14 and two parallel legs 16, 18 extending from the base portion, each of said legs defining a retaining surface 24, 26 on their outwardly disposed surfaces and a keeper 20 having a relatively flat plate 40 defining at least two spaced openings 42, 44 for receiving the legs 16, 18 of the body member 12, the edges of the opening 42, 44 are in engagement with the retaining surfaces 24, 26 of the legs 16, 18 when the keeper 20 is engaged with the body member 12 characterized in that:

said keeper 20 includes means 50, 52 for positioning a cable placed between the legs 16, 18 of said body member 12 against a selected portion of the body member 12 said positioning means defining a continuous straight camming edge 54, 56, a straight line along said edge intersects the axes of said legs 16, 18 at an acute angle, said camming edge 54, 56 of said positioning means 50, 52 being defined by a first planar wall 50, 52 extending from said keeper plate 40, the end of said wall 50 defining said camming edge 54 and serving to urge a cable placed between said legs 16, 18 against said base 12 and against one of said legs 18 of said body member 12 and away from the opposite leg of said body member 12.

2. The apparatus of claim 1 further characterized by a second planar wall 52 extending from said plate 40, spaced from and parallel to said first wall 50 and defining a second continuous straight camming edge 56 lying along a common plane with the camming edge 54 of said first wall 50.

3. The apparatus of claim 2 further characterized by each of said walls 50, 52 having a length greater than the distance between the legs 16, 18 of said body member 12, said walls 50, 52 being spacially positioned on opposite sides of said plate openings 44, 46 so that when said keeper 20 is placed into engagement with said body member 12, said walls 50, 52 are positioned on opposite sides of the legs 16, 18 of the body member 12.

4. The apparatus of claim 3 further characterized by the retaining surface being in the form of a plurality of teeth 24, 26 on said legs 16, 18 extending from the end of each leg and terminating a predetermined distance from said base 14 and each of said first and second walls 50, 52 having a maximum height above said keeper plate 40 at least as great as said predetermined istance.

* * * * *